(12) United States Patent
Xing

(10) Patent No.: US 7,553,229 B2
(45) Date of Patent: Jun. 30, 2009

(54) ACTIVE REFERENCING METHOD WITH INTERLEAVED CROSSHAIR NAVIGATION FRAMES

(75) Inventor: Chen Qing Xing, Kuala (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 527 days.

(21) Appl. No.: 11/385,160

(22) Filed: Mar. 21, 2006

(65) Prior Publication Data

US 2007/0225072 A1 Sep. 27, 2007

(51) Int. Cl.
*A63F 13/04* (2006.01)

(52) U.S. Cl. .......................... 463/5; 345/157; 345/158; 463/30

(58) Field of Classification Search ...................... 463/2, 463/5, 53; 235/454; 345/157–158
See application file for complete search history.

(56) References Cited

U.S. PATENT DOCUMENTS

| 4,844,476 | A | | 7/1989 | Becker | |
|---|---|---|---|---|---|
| 5,267,034 | A | * | 11/1993 | Miyatake et al. | 348/352 |
| 6,110,039 | A | * | 8/2000 | Oh | 463/2 |
| 6,955,598 | B2 | * | 10/2005 | Hagiwara et al. | 463/5 |
| 7,420,540 | B2 | * | 9/2008 | Olbrich | 345/158 |
| 2001/0046889 | A1 | * | 11/2001 | Hagiwara et al. | 463/5 |
| 2007/0225072 | A1 | | 9/2007 | Xing | |
| 2008/0180395 | A1 | * | 7/2008 | Gray | 345/157 |

* cited by examiner

*Primary Examiner*—Corbett B Coburn
*Assistant Examiner*—David Duffy

(57) ABSTRACT

A video game has a plurality of gaming image frames for displaying gaming images of the video game, and a plurality of crosshair navigation frames interleaved among the gaming image frames. During gameplay of the video game, an optical projection of the gaming image frames and the crosshair navigation frames are video captured whereby a crosshair position is navigated within the display of the gaming images of the video game based on a cross-correlation of the video capture of two or more of the crosshair navigation frames.

20 Claims, 14 Drawing Sheets

ACTIVE REFERENCING METHOD WITH INTERLEAVED CROSSHAIR NAVIGATION FRAMES

FIELD OF THE INVENTION

The present invention relates to the gaming industry. More particularly, the present invention relates to optical sensors used in the gaming industry to determine the crosshair position a gaming gun is pointing at within the context of gaming image frames being projected by a display device.

BACKGROUND OF THE INVENTION

In the gaming industry, game console manufacturers currently use optical sensors to video capture gaming image frames being optically projected by a display device in determining the position a gaming gun is pointing at within the context of the projected gaming image frames. However, the inherent nature of this methodology is the need to perform calibration upon startup of the video game in order to obtain the absolute position of the gaming gun relative to the display device. If the gamer moves away from his initial reference position during the course of the game, then the accuracy of the aiming will degrade as the gaming image frames are now being captured at a new angle by the optical sensor. Accordingly, there is a need for an active referencing methodology in the gaming industry that addresses the aforementioned drawback with this particular use of optical sensors.

SUMMARY OF THE INVENTION

The present invention provides a new and unique active reference methodology involving an interleaving of crosshair navigation frames between normal gaming image frames.

One form of the present invention is a video game comprising a plurality of gaming image frames operable to display gaming images of the video game, and a plurality of crosshair navigation frames interleaved among the plurality of gaming image frames. The plurality of crosshair navigation frames are operable to facilitate a navigation of a crosshair position within a display of the gaming images of the video game based on a cross-correlation of a video capture of two or more of the plurality of crosshair navigation frames.

A second form of the present invention is a gaming optical sensor comprising a video capturing module and a crosshair navigation module. The video capturing module is operable to generate frame image data indicative of a video capture of an optical projection of a plurality of gaming image frames displaying gaming images of a video game and of a plurality of crosshair navigation frames interleaved among the plurality of gaming image frames. The crosshair navigation module is operable to be in communication with the video capturing module to receive the frame image data to thereby generate crosshair navigation data indicative of a navigation of a crosshair position within the display of the gaming images of the video game based on a cross-correlation of a video capture of two or more of the plurality of crosshair navigation frames as indicated by the frame image data.

A third form of the present invention is a method of operating a video game comprising a generation of frame image data indicative of a video capture of an optical projection of a plurality of gaming image frames displaying gaming images of a video game and of a plurality of crosshair navigation frames interleaved among the plurality of gaming image frames, and a generation of crosshair navigation data indicative of a navigation of a crosshair position within the display of the gaming images of the video game based on a cross-correlation of a video capture of two or more of the plurality of crosshair navigation frames as indicated by the frame image data.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereto.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
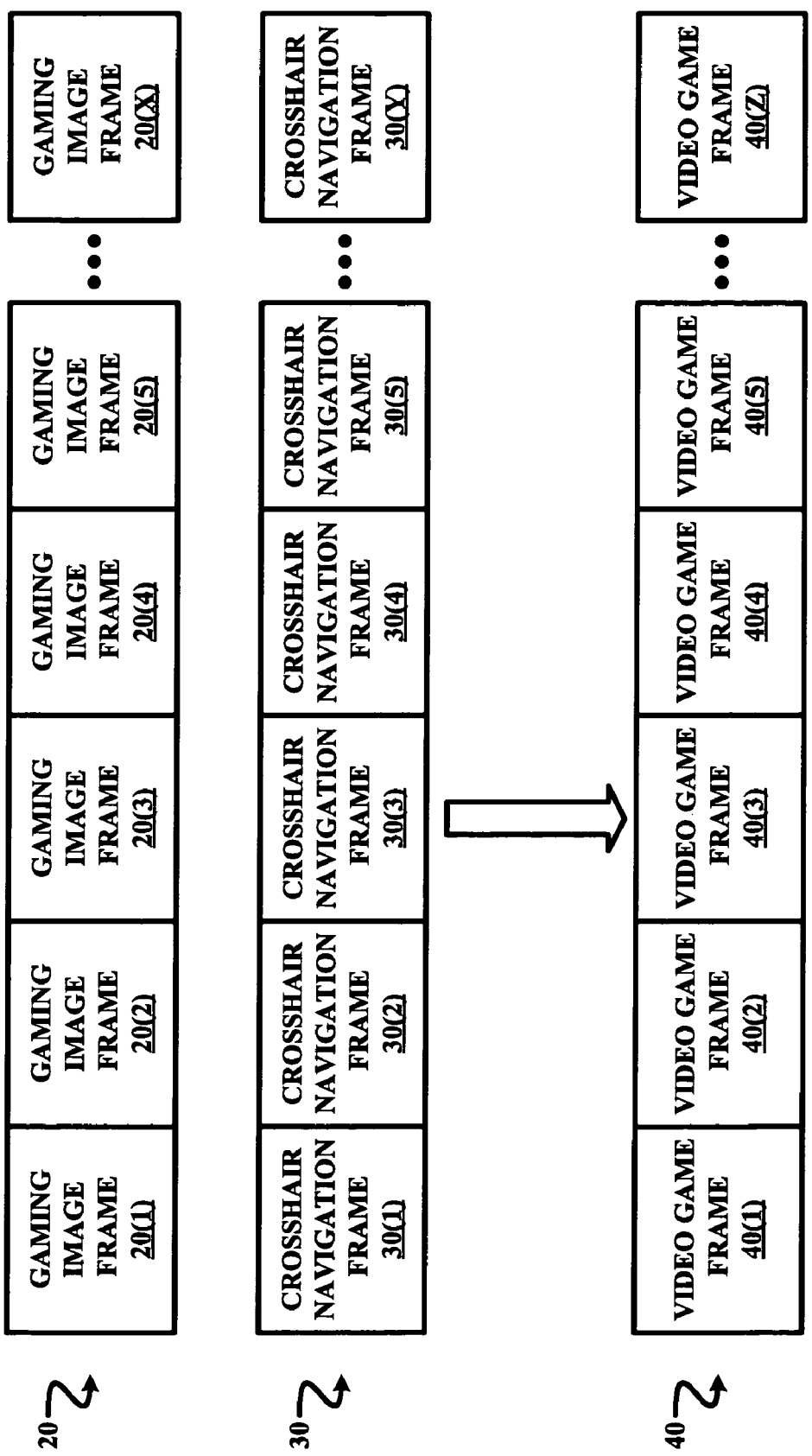
FIG. 1 illustrates frames of a video game in accordance with the present invention.
Figure 2:
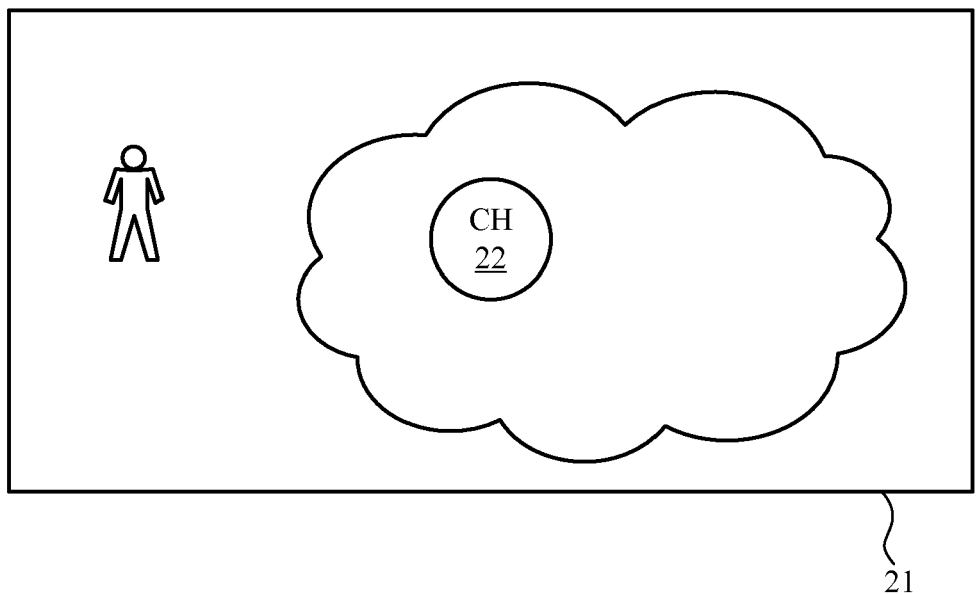
FIG. 2 illustrates an exemplary embodiment of a gaming image frame as known in the art.

FIG. 1 illustrates a series of an X number of gaming image frames 20, where $X \geq 1$. Gaming image frames 20 as known in the art are utilized to display gaming images of a video game. The present invention does not impose any limitations or any restrictions as to the form of gaming image frames 20. FIG. 2 illustrates an exemplary gaming image 21 having a movable crosshair ("CH") position 22.

Figure 3:
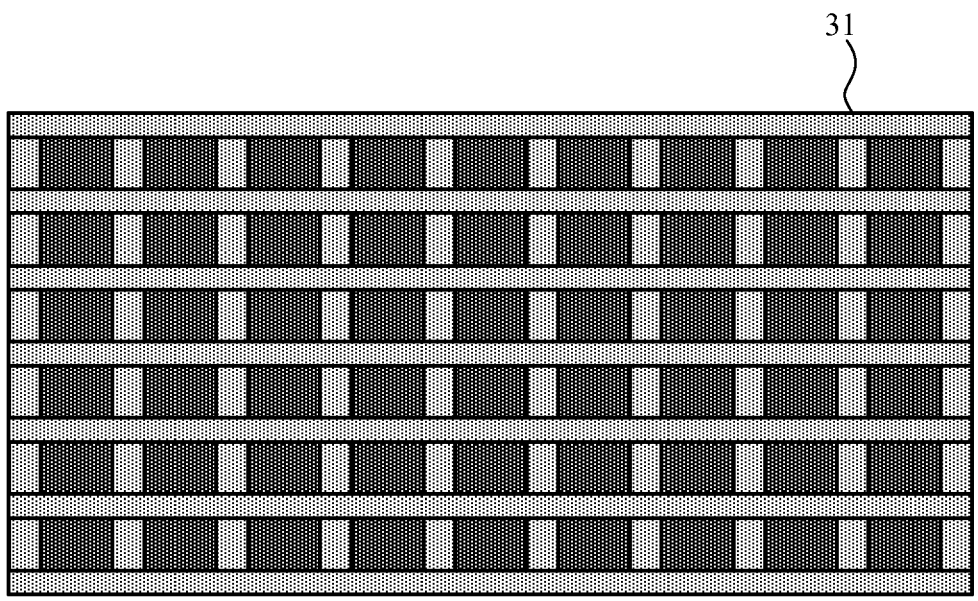
FIG. 3 illustrates an exemplary embodiment of a crosshair navigation frame in accordance with the present invention.

FIG. 1 further illustrates a series of a Y number of crosshair navigation frames 30 in accordance with the present invention, where $Y \geq 1$. Crosshair navigation frames 30 facilitate a navigation of a crosshair position within a display of the gaming images of the video game based on a cross-correlation of a video capture of two or more crosshair navigation frames 30 as will be further explained in detail herein. The present invention does not impose any limitations or any restrictions as to the form of crosshair navigation frames 30. Nonetheless, human eyes are less sensitive to a display of dark images as compared to a display of bright images and a recognizable image pattern is advantageous for a digital image processing of video captured frames. Thus, in one embodiment, crosshair navigation frames 30 displays a recognizable dark crosshair navigation image pattern, symmetrical and/or asymmetrical, that is not detectable by the human eye at a suitable frame rate, such as, for example, an exemplary crosshair navigation frame 31 of a dark crosshair navigation image pattern as shown in FIG. 3.

Figure 4:
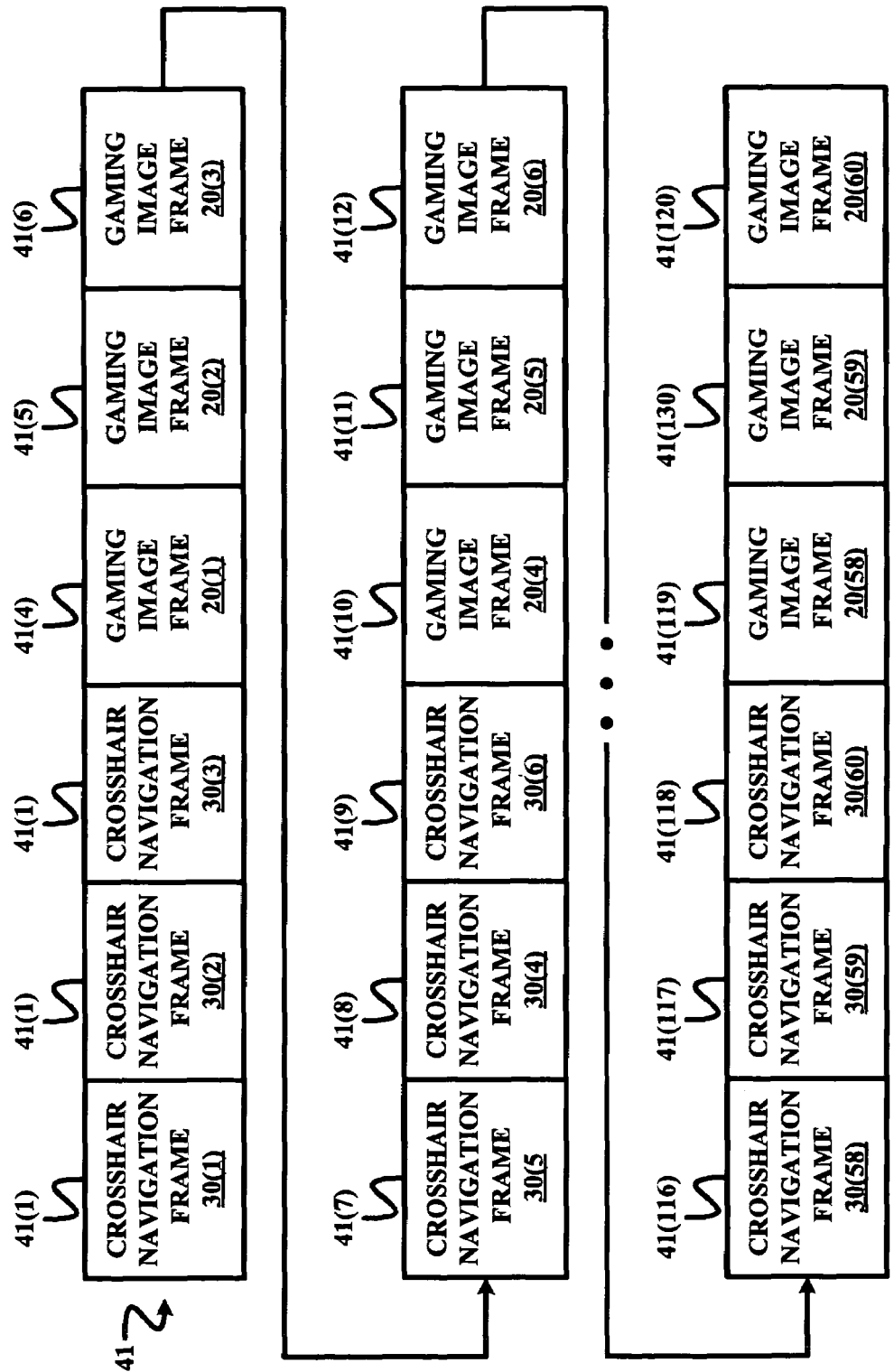
FIG. 4 illustrates an exemplary embodiment of the video game illustrated in FIG. 1.

The present invention is premised on providing an active referencing methodology based on an interleaving of crosshair navigation frames 30 among gaming image frames 20 to yield a series of a Z number of video game frames 40, where Z=X+Y whereby each video game frame 40 is either a gaming image frame 20 or a crosshair navigation frame 30. The present invention does not impose any limitations or any restrictions to the structured interleaving of crosshair navigation frames 30 among gaming image frames 20. In one embodiment, as shown in FIG. 4, a series of 120 video game frames 41 includes an interleaving of sixty gaming image frames 20 and sixty crosshair navigation frames 30 in sets of three frames. In this embodiment, video game frames 41 can represent one second of game play based on a 120 frame per second of a PC video card frame.

Figure 5:
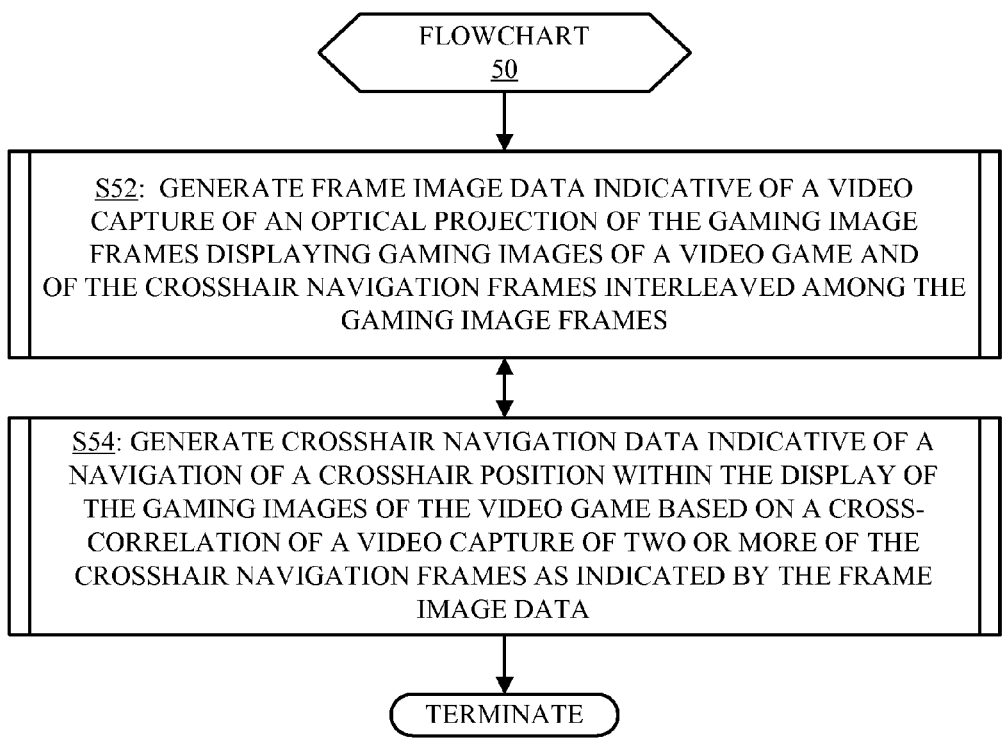
FIG. 5 illustrates a flowchart representative of an active reference method in accordance with the present invention.
Figure 6:
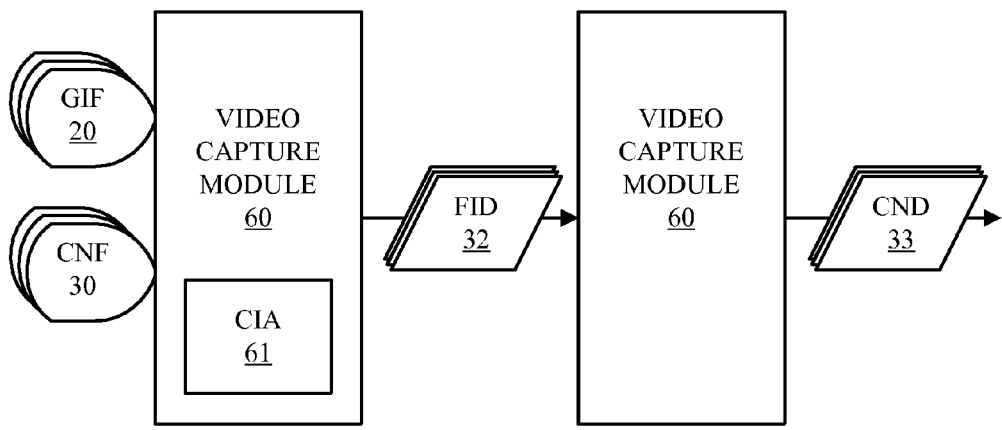
FIG. 6 illustrates one embodiment of a gaming optical sensor in accordance with the present invention.

The active referencing methodology of the present invention is represented by a flowchart 50 shown in FIG. 5 that is implemented by a video capture module 60 and a crosshair navigation module 62 illustrated in FIG. 6. During a stage S52 of flowchart 50, video capture module 60 is structurally configured with hardware, software and/or firmware to generate frame image data ("FID") 32 indicative of a video capture of an optical projection of gaming image frames ("GIF") 20 displaying the gaming images of the video game and of the video capture crosshair navigation frames ("CNF") 30 interleaved among gaming image frames 20. In one embodiment, the generation of frame image data 32 by video capture module 60 includes an optical capture of gaming image frames 20 and crosshair navigation frames 30 within a capture image area 61. Of particular importance to a stage S54 of flowchart 50 is the optical capture of each crosshair navigation frame 30 in terms of whether or not an inclusive view of each crosshair navigation frame 30 is optically captured by video capture module 60 within capture image area 61, such as, for example, whether or not an inclusive view of crosshair navigation image pattern 31 (FIG. 3) is optically captured by video capture module 60 within capture image area 61 on a per crosshair navigation frame basis.

During stage S54, crosshair navigation module 62 is structurally configured with hardware, software and/or firmware to generate crosshair navigation data ("CND") 33 that is indicative of a navigation of a crosshair position within a display of the gaming images of the video game (e.g., crosshair position 22 within gaming image 21 as shown in FIG. 2). The generation of crosshair navigation data 33 is based on a cross-correlation by crosshair navigation module 62 of the video capture of two or more crosshair navigation frames 30 as indicated by frame image data 32. In one embodiment, each crosshair navigation frame involved in a cross-correlation facilitates a valid pattern recognition of a crosshair navigation image pattern within capture image area 61, such as, for example, an inclusive view of crosshair navigation image pattern 31 within capture image area 61.

Flowchart 50 is a persistent process as represented by the bi-directional arrow between stage S52 and stage S54 that can be terminated anytime by a gamer. In one embodiment, those having ordinary skill in the art will appreciate that sequences of two or more video captured crosshair navigation frames 30 can be processed during stage S54 in view of the fact that invalid views of crosshair navigation image patterns 31 may be video captured by video capture module 60 during flowchart 50.

Figure 7:
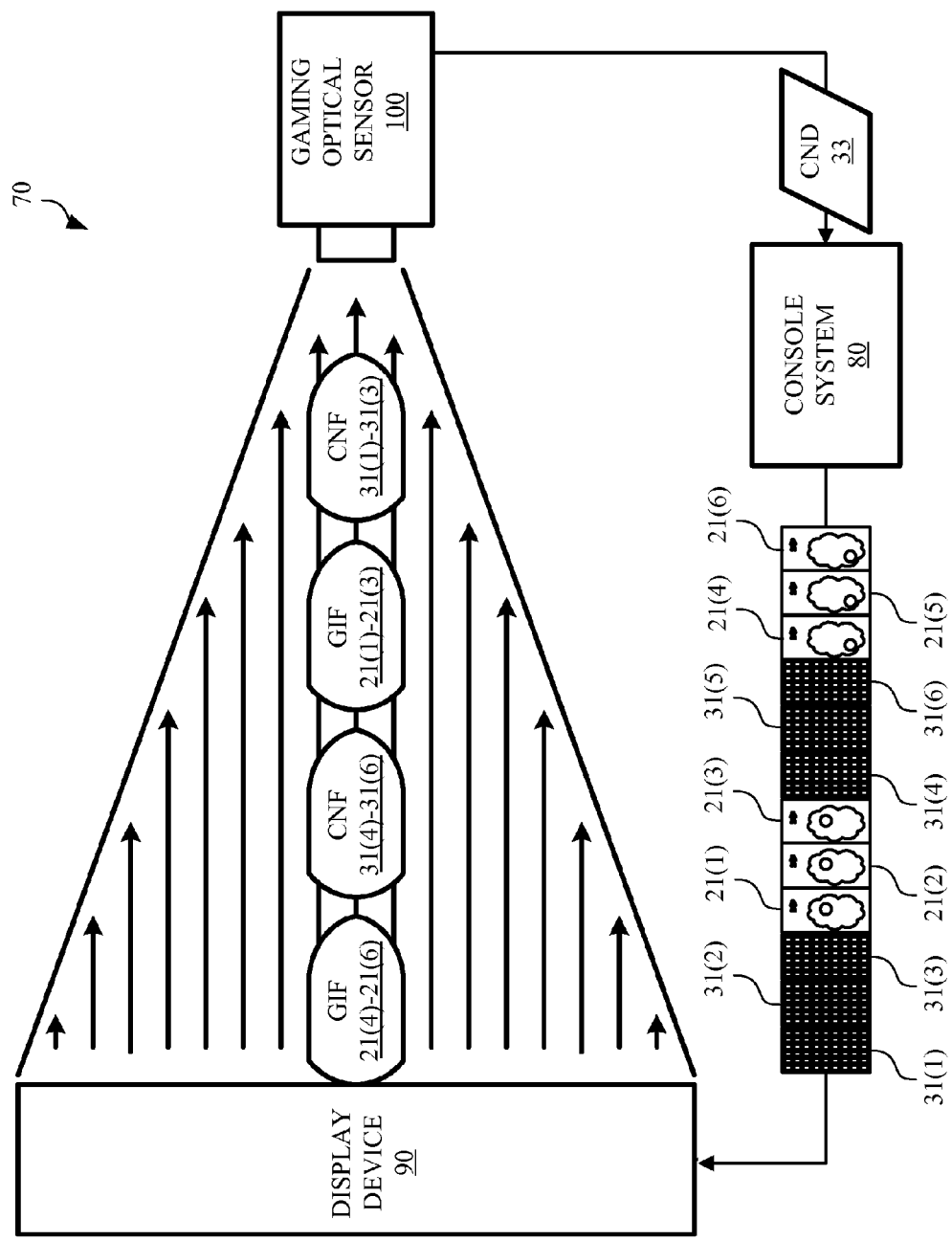
FIG. 7 illustrates one embodiment of a gaming system in accordance with the present invention.

To facilitate a further understanding of the present invention, a more detailed description of an exemplary embodiment of the active reference method of the present invention in association with a supporting gaming system will now be provided herein. FIG. 7 illustrates a gaming system 70 employing a console system 80, a display device 90 and a gaming optical sensor 100. In operation, console system 80 communicates the video game to display device 90, such as, for example, an interleaving series of crosshair navigation frames 31(1)-31(3), gaming image frames 21(1)-21(3), crosshair navigation frames 31(4)-31(6) and gaming image frames 21(4)-21(6) as shown. In turn, display device 90 optically projects the interleaving series of crosshair navigation frames 31(1)-31 (3), gaming image frames 21(1)-21(3), crosshair navigation frames 31(4)-31(6) and gaming image frames 21(4)-21(6) as shown. Gaming optical sensor 100 video captures the optical projection of the interleaving series of crosshair navigation frames 31(1)-31 (3), gaming image frames 21(1)-21(3), crosshair navigation frames 31(4)-31(6) and gaming image frames 21(4)-21(6) to thereby generate crosshair navigation data 33 as will be further explained herein.

Figure 8:
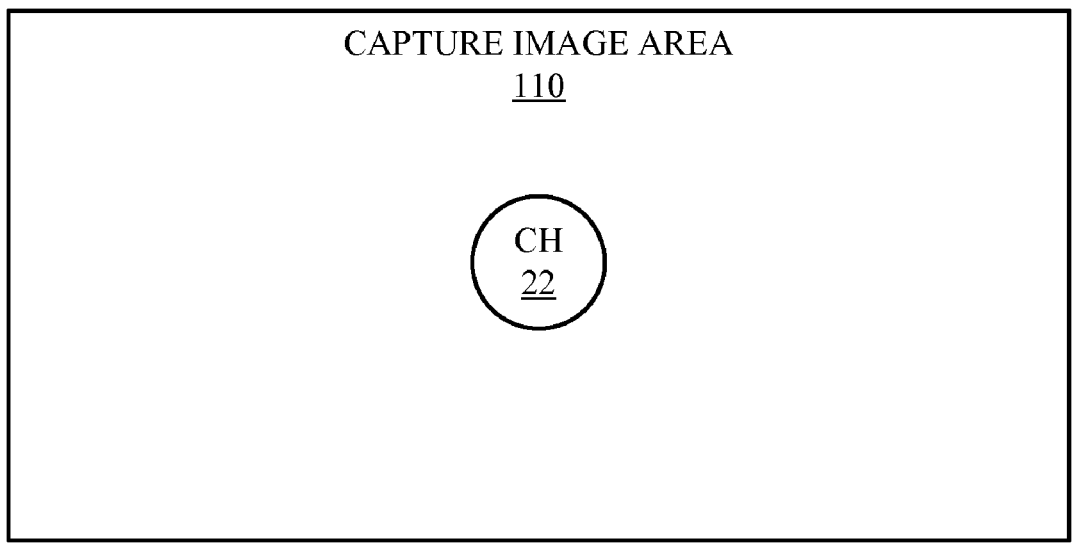
FIG. 8 illustrates an exemplary capture image area of a gaming optical sensor in accordance with the present invention.

In practice, the precise manner by which gaming optical sensor 100 video captures the optical projection of the interleaving series of crosshair navigation frames 31(1)-31(3), gaming image frames 21(1)-21(3), crosshair navigation frames 31(4)-31(6) and gaming image frames 21(4)-21(6) is dependent upon a dynamic positioning and orientation of gaming optical sensor 100 by a gamer relative to display device 90. Specifically, FIG. 8 illustrates a capture image area 110 of gaming optical sensor 100 having a crosshair position ("CH") 22 in the middle thereof, and the dynamic positioning and orientation of gaming optical sensor 100 by the gamer relative to display device 90 determines to what degree the frames 21 and 31 are video captured by gaming optical sensor 100 within capture image area 110.

Figure 9:
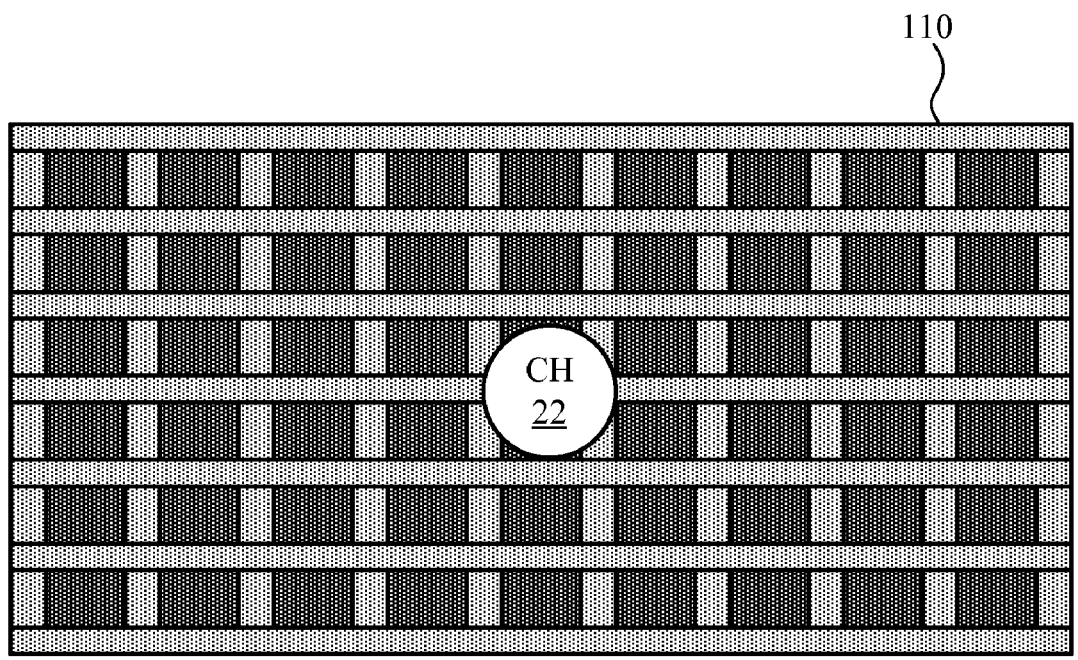
FIGS. 9-15 illustrates various views of video captures of crosshair navigation frames in accordance with the present invention.

For example, FIG. 9 exemplarily illustrates an exact inclusive video capture of crosshair navigation dark image pattern of crosshair navigation frame 31 (FIG. 2) within capture image area 110 based on gaming optical sensor 100 being precisely positioned and precisely oriented by the game with respect to display device 90.

Figure 10:
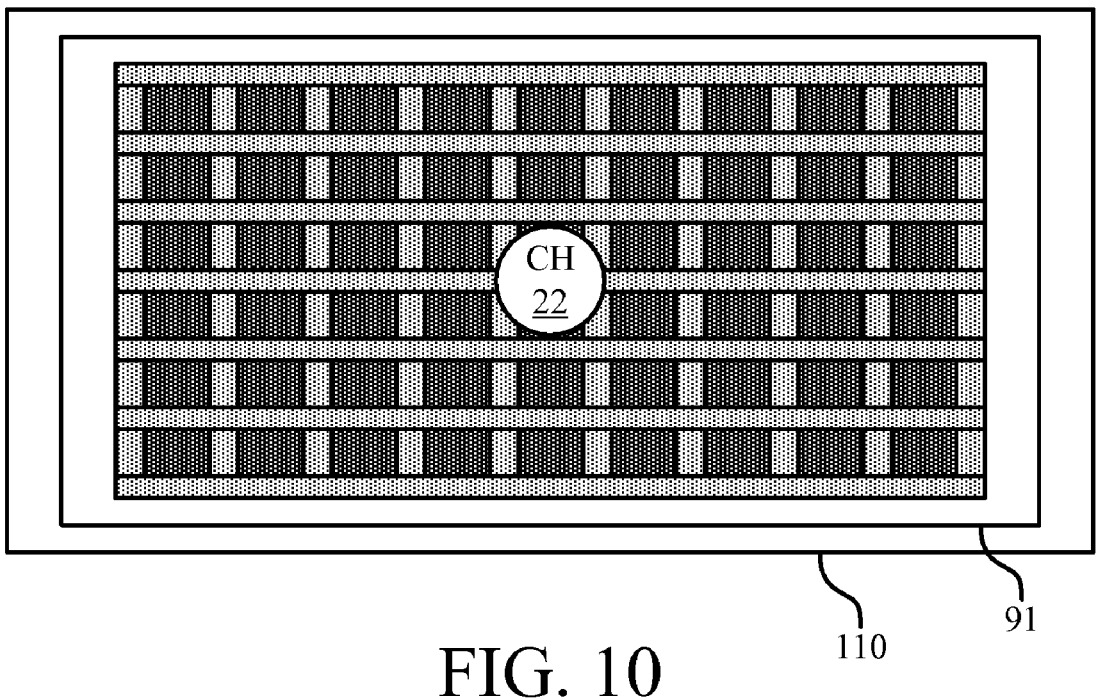

FIG. 10 exemplarily illustrates an inclusive video capture of the crosshair navigation dark image pattern of crosshair navigation frame 31 within capture image area 110 based on gaming optical sensor 100 being remotely positioned and precisely oriented by the gamer with respect to display device 90 whereby a frame 91 of display device 90 is also video captured by gaming optical sensor 100.

Figure 11:
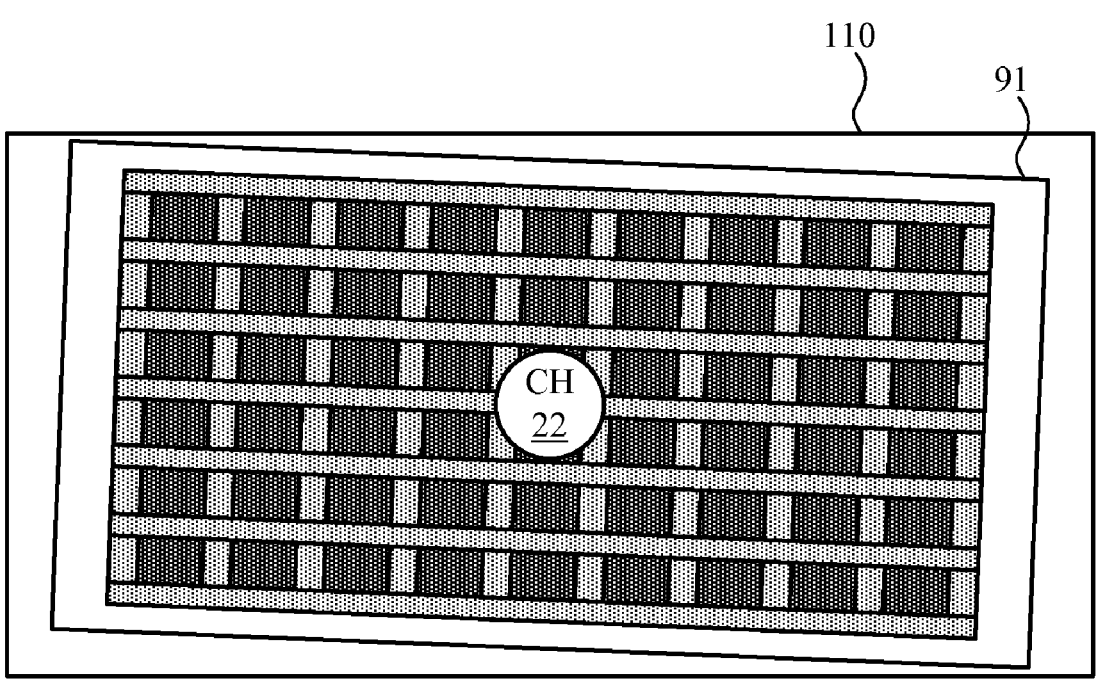

FIG. 11 exemplarily illustrates an inclusive capture of the crosshair navigation dark image pattern of crosshair navigation frame 31 within capture image area 110 based on gaming optical sensor 100 being remotely positioned and angularly oriented by the gamer with respect to display device 90 whereby a frame 91 of display device 90 is again video captured by gaming optical sensor 100.

Figure 12:
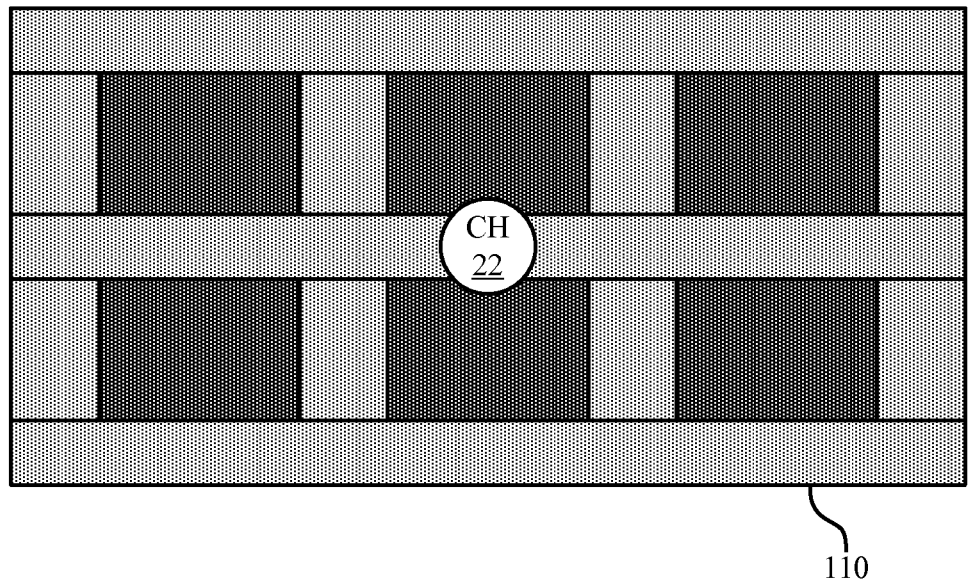

FIG. 12 exemplarily illustrates an exclusive video capture of the crosshair navigation dark image pattern of crosshair navigation frame 31 within capture image area 110 based on gaming optical sensor 100 being locally positioned and precisely oriented by the gamer with respect to with display device 90.

Figure 13:
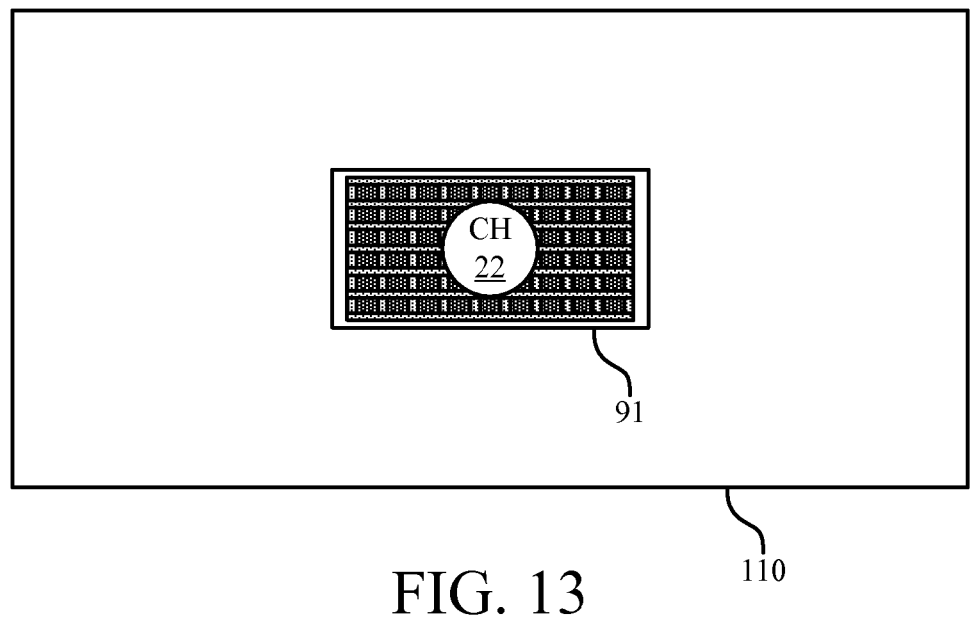

FIG. 13 exemplarily illustrates an inclusive video capture of the crosshair navigation dark image pattern of crosshair navigation frame 31 within capture image area 110 based on gaming optical sensor 100 being very remotely positioned and precisely oriented by the game with respect to display device 90 whereby a frame 91 of display device 90 is still video captured by gaming optical sensor 100.

Figure 14:
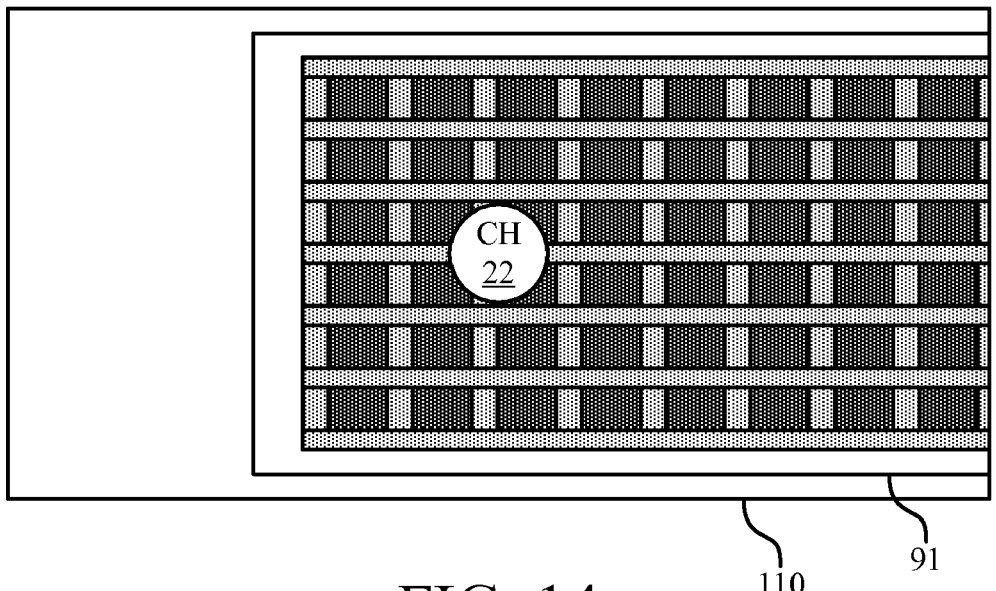

FIG. 14 exemplarily illustrates a partial video capture of the crosshair navigation dark image pattern of crosshair navigation frame 31 within capture image area 110 based on gaming optical sensor 100 being remotely positioned with an offset orientation by the gamer with respect to display device 90 whereby crosshair position 22 is inclusive of the crosshair navigation dark image pattern.

Figure 15:
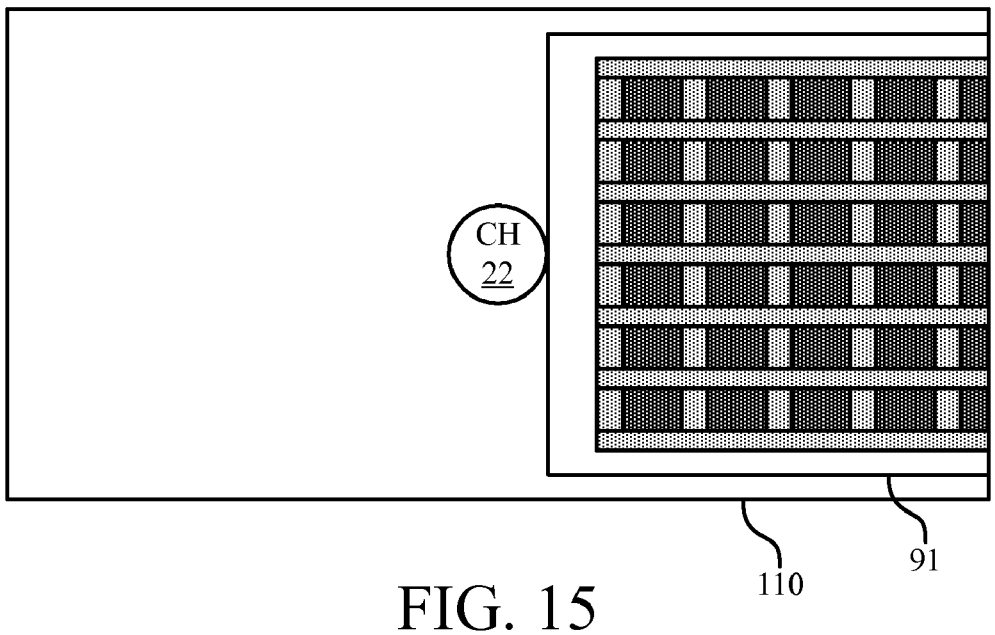

FIG. 15 exemplarily illustrates an exclusive video capture of the crosshair navigation dark image pattern of crosshair navigation frame 31 within capture image area 110 based on gaming optical sensor 100 being remotely positioned with a more extreme offset orientation by the gamer with respect to display device 90 whereby crosshair position 22 is exclusive of the crosshair navigation dark image pattern.

Figure 16:
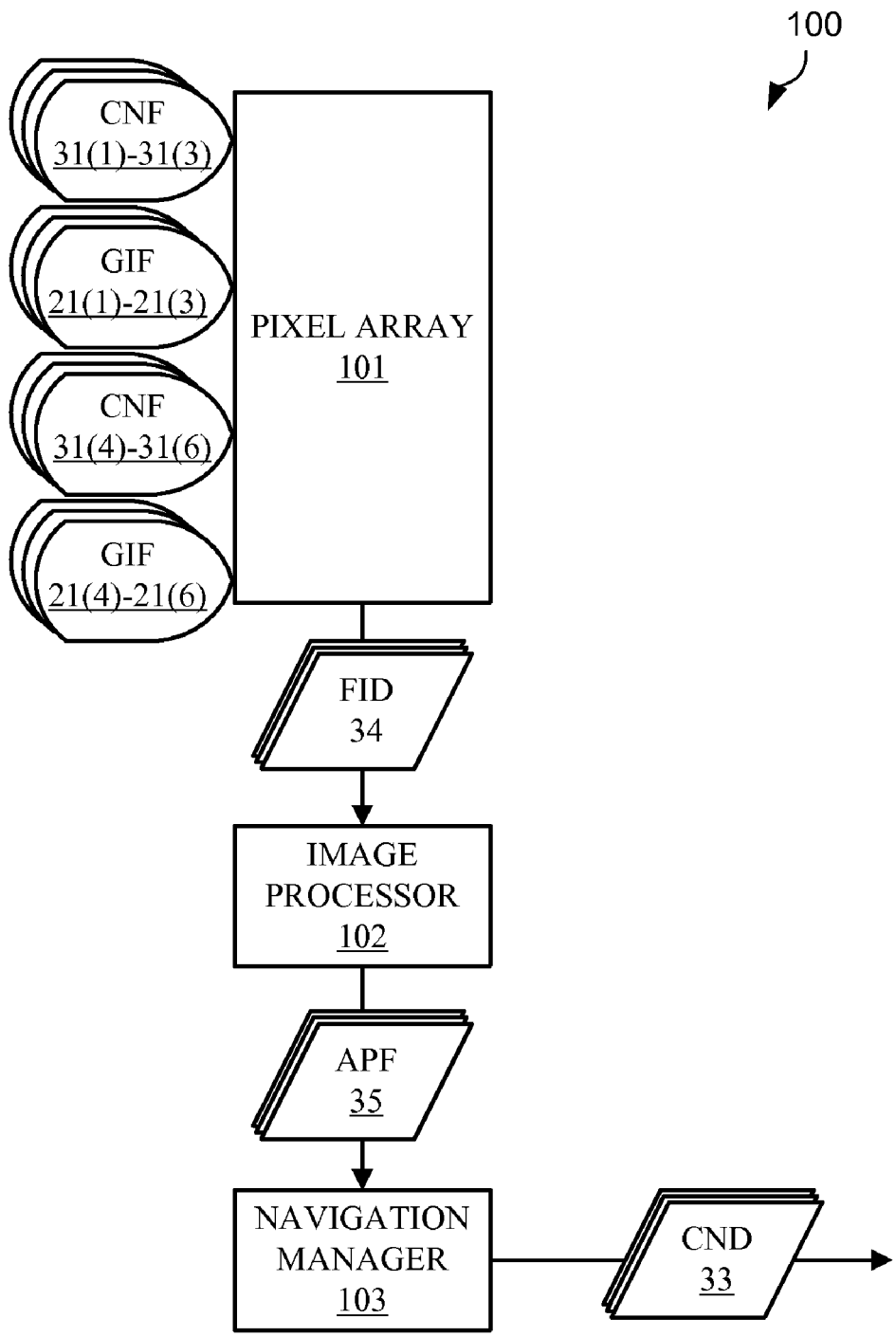
FIG. 16 illustrates one embodiment in accordance with the present invention of the gaming optical sensor illustrated in FIG. 6.
Figure 17:
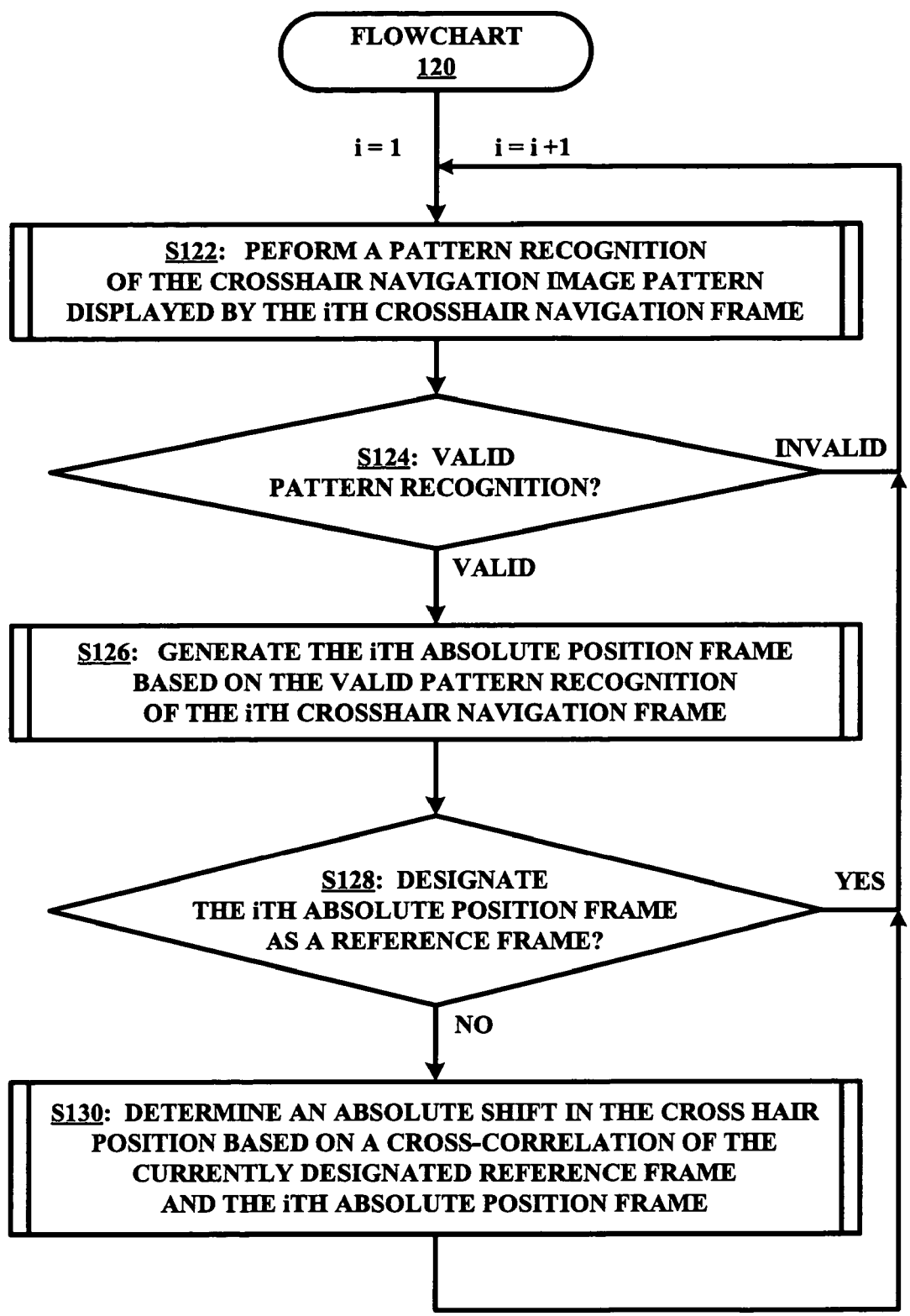
FIG. 17 illustrates a flowchart representative of one embodiment in accordance with the present invention of the active referencing method illustrated in FIG. 5.

The purpose of FIGS. 8-15 is to emphasize various degrees to which crosshair navigation frames can be video captured by gaming optical sensor 100. FIG. 16 illustrates an embodiment of gaming optical sensor 100 suitable for implementing a flowchart 120 representative of an active referencing method of the present invention as shown in FIG. 17 that is premised on video captures of crosshair navigation frames as exemplarily illustrated in FIGS. 8-15.

In operation, pixel array 101 of gaming optical sensor 100 defines the capture imaging area and generates frame image data ("FID") 34 representative of an optical capture of crosshair navigation frames 31(1)-31(3), gaming image frames 21(1)-21(3), crosshair navigation frames 31(4)-31(6) and gaming image frames 21(4)-21(6) within the capture image area as would be appreciated by those having ordinary skill in the art. Pixel array 101 communicate frame image data 34 to a image processor 102 of gaming optical sensor 100 in a sequential format representative of an optical capture sequence of crosshair navigation frames 31(1)-31(3), gaming image frames 21(1)-21(3), crosshair navigation frames 31(4)-31(6) and gaming image frames 21(4)-21(6).

As the sequential format of frame image data 34 is being communicated, image processor 102 filters out each gaming image frames 21(1)-21(6) from frame image data buffers each crosshair navigation frames 31(1)-31(6) as would be appreciated by those having ordinary skill in the art whereby image processor 102 processes the frame image data 34 associated of crosshair navigation frames 30 during stages S122, S124 and S126 of flowchart 120 to generate useful absolute position frames and a navigation manager 103 of gaming optical sensor 100 performs frame cross-correlation on the absolute position frame data as needed to generate useful crosshair navigation data.

Specifically, stage S122 encompasses image processor 102 performing a pattern recognition of a crosshair navigation image pattern displayed by the ith crosshair navigation frame 31, and stage S124 encompasses image processor 102 determining whether the pattern recognition of stage S122 is valid or invalid in accordance with a pattern recognition validity policy. In one embodiment of the policy, a pattern recognition of stage S122 is deemed valid if and only if an inclusive view of the crosshair navigation image pattern is within the capture image are, such as, for example, as shown in FIGS. 9-11. FIG. 13 also exemplarily illustrates an inclusive view of the crosshair navigation image pattern is within the capture image, but nonetheless may be considered invalid per the policy in view of the diminutive size of the inclusive view.

If image processor 102 determines the pattern recognition of stage S122 to be invalid, then image processor 102 returns to the stage S122 to perform a pattern recognition of a crosshair navigation image pattern displayed by the next crosshair navigation frame 31 in the captured sequence Otherwise, image processor 102 proceeds to stage S126 to generate an ith absolute position frame based on the valid pattern recognition of the ith crosshair navigation frame 31 whereby stage S128 encompasses navigation manager 103 determining whether or not to designate the ith absolute position frame as a reference frame in accordance with a reference frame policy. In one embodiment, the reference frame policy may specify such a designation if a reference frame does not already exist or the currently designated reference frame is inappropriate or ineffective as a reference in the context of the positioning and orientation of the preceding absolute position frame(s) based on one or more from a variety of factors as would be appreciated by those having ordinary skill in the art.

If navigation manager 103 designates the ith absolute position frame as the reference frame, then navigation manager 103 reports the crosshair position 22 of the reference frame as crosshair navigation data ("CND") 33 to game console 80 and thereafter returns to stage S122 whereby image process04 102 will process the next captured crosshair navigation frame 31. Otherwise, navigation manager 103 proceeds to stage S130 to determine an absolute shift in the crosshair position based on a cross-correlation of the currently designated reference frame and the ith absolute position frame. In this case, the crosshair navigation data 33 is derived from the absolute shift in the crosshair position.

Figure 18A:
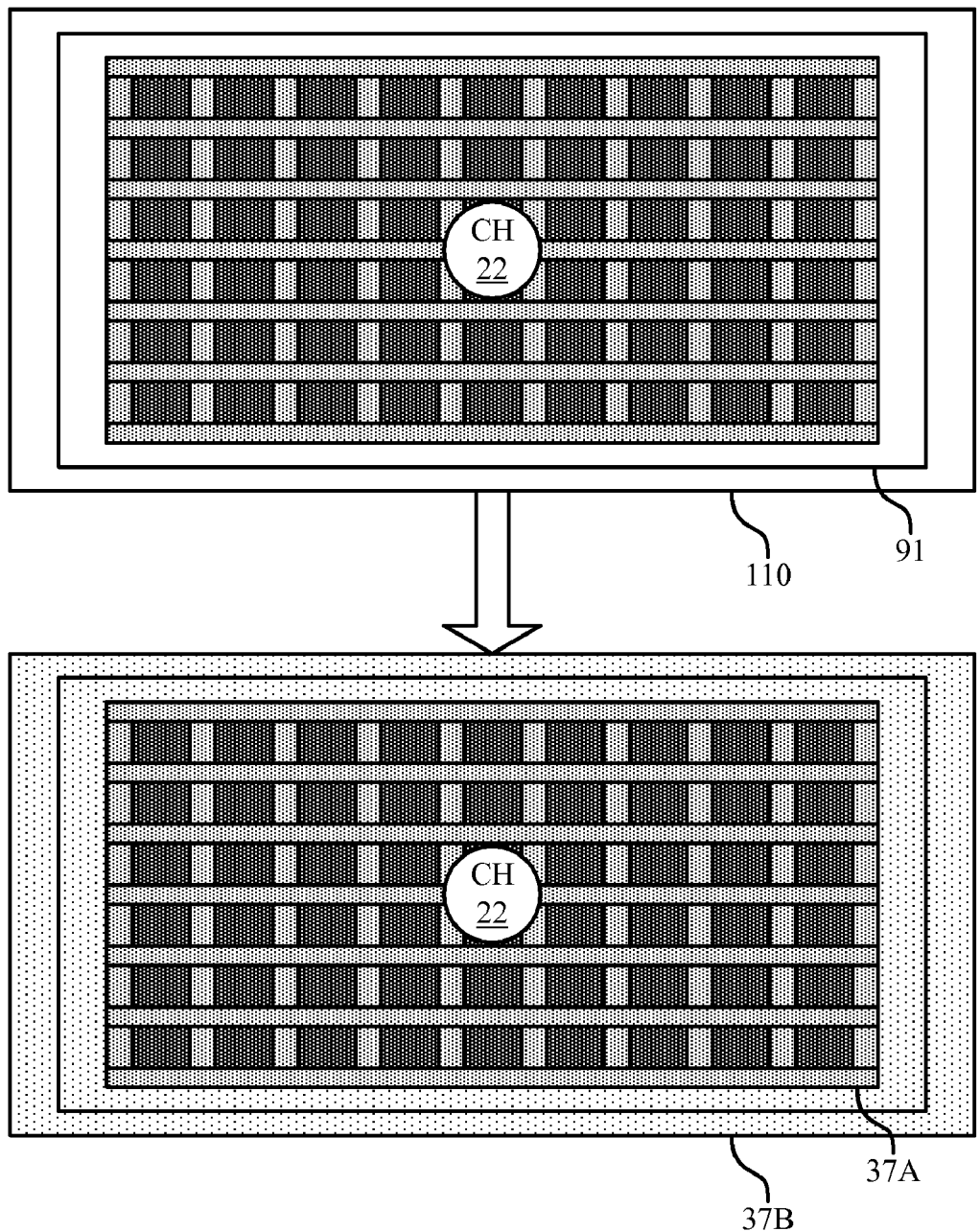
FIGS. 18A and 18B illustrate exemplary filtered and pattern recognized crosshair navigation image patterns obtained from two successive crosshair navigation frames in accordance with the present invention.
Figure 18B:
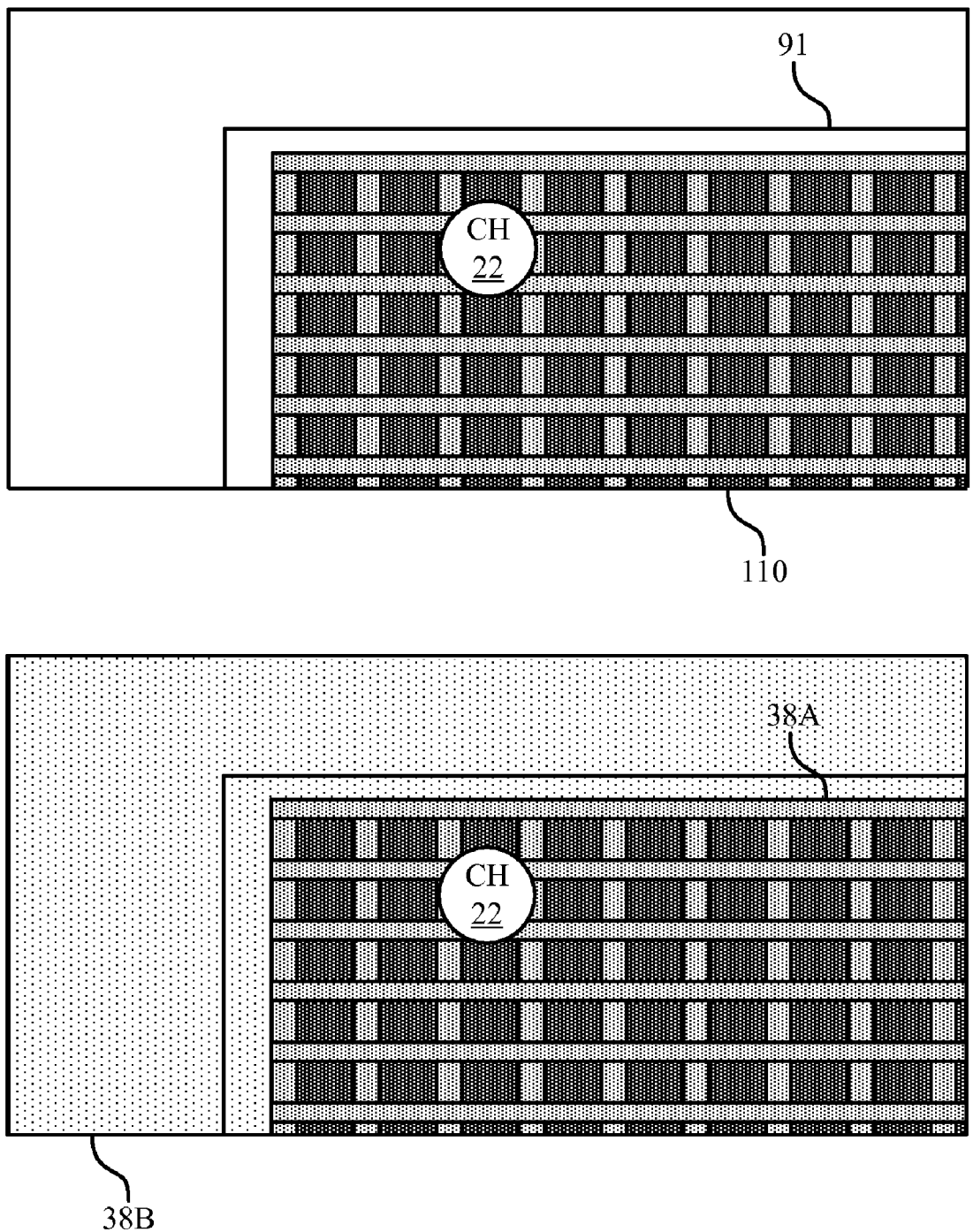

To facilitate a further understanding of flowchart 120, a processing in accordance with flowchart 120 of a video capture of crosshair navigation frame 31(1) as exemplary shown in FIG. 18A and video capture of crosshair navigation frame 31(2) as exemplary shown in FIG. 18B will now be provided herein.

During stage S122 for crosshair navigation frame 31 (1), image processor 102 filters out TV frame 91 and any other background context from the crosshair navigation frame 31(1) to thereby perform pattern recognition of the crosshair navigation image pattern of crosshair navigation frame 31(1). The result, as shown in FIG. 18A, is an effective area 37A of crosshair navigation frame 31(1).

During stage S124 for crosshair navigation frame 31(1), image processor 102 determines the pattern recognition of stage S122 is valid in view of the inclusive view of crosshair navigation image pattern as represented by effective area 37A.

During stage S126 for crosshair navigation frame 31(1), image processor 102 generates an absolute position frame 37B as shown in FIG. 18A based on the valid pattern recognition of the crosshair navigation frame 31(1). The perimeter of the absolute position frame 37B coincides with the perimeter of capture image area 110 (FIG. 8).

During stage S128 for crosshair navigation frame 31(1), navigation manager 103 designates crosshair navigation frame 31(1) as the reference frame in view of the fact that a reference frame does not already exist and returns to stage S122 for crosshair navigation frame 31(2). Alternatively, a default reference frame could be designed whereby navigation manager 103 would only designate crosshair navigation frame 31(1) as the new reference frame if and only if the default reference frame would be inappropriate or ineffective as a reference frame for crosshair navigation frame 31(1).

During stage S122 for crosshair navigation frame 31(2), image processor 102 filters out TV frame 91 and any other background context from the crosshair navigation frame 31(2) to thereby perform pattern recognition of the crosshair navigation image pattern of crosshair navigation frame 31(2). The result, as shown in FIG. 18B, is an effective area 38A of crosshair navigation frame 31(2).

During stage S124 for crosshair navigation frame 31(12), image processor 102 determines the pattern recognition of stage S122 is valid in view of the inclusive view of crosshair navigation image pattern as represented by effective area 38A.

During stage S126 for crosshair navigation frame 31(2), image processor 102 generates an absolute position frame 38B as shown in FIG. 18B based on the valid pattern recognition of the crosshair navigation frame 31(2). The perimeter of the absolute position frame 38B coincides with the perimeter of capture image area 110 (FIG. 8).

During stage S128 for crosshair navigation frame 31(2), navigation manager 103 does not designate crosshair navigation frame 31(2) as the reference frame in view of the fact crosshair navigation frame 31(1) has been previously designated as such.

Figure 19:
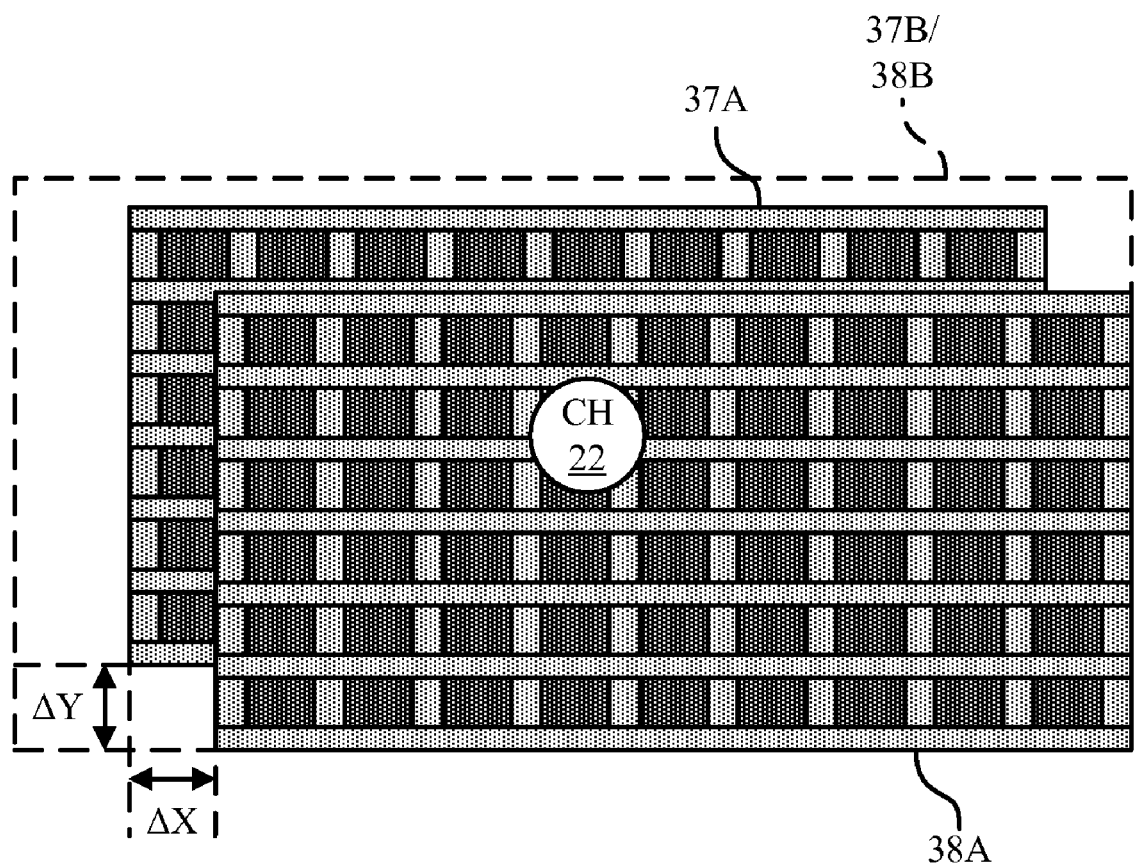
FIG. 19 illustrates an exemplary cross-correlation of the filtered and pattern recognized crosshair navigation image patterns illustrated in FIGS. 18A and 18B.

During stage S130 for crosshair navigation frame 31(2), navigation manager 103 determines an absolute shift in crosshair position 22 based on a cross-correlation of effective area 37A of absolute position frame 37B and effective area 38A of absolute position frame 38B. For example, as shown in FIG. 19, absolute position frame 37B and absolute position frame 38B are aligned yield a .DELTA. X and .DELTA. Y as indication of an absolute shift in crosshair position 22 from its position in effective area 37A to its position in effective area 38A. Navigation manager 102 reports .DELYA. X and .DELTA. Y as crosshair navigation data 33 for console system 80 to navigate the crosshair position within the display of the gaming images of the video game.

From there, flowchart 120 would be implemented for each crosshair navigation frames 31(3)-31(6) and so on and so on in a manner that provides an very accurate and timely crosshair positioning.

Referring to FIGS. 1-19, those having ordinary skill in the art will appreciate how to apply the inventive principles of the present invention to any type of video game.

Referring to FIGS. 1-19, those having ordinary skill in the art will further appreciate numerous advantages and benefits of the present invention, including, but not limited to, providing a gamer with a larger degree of freedom to move around during the course of a game.

While the embodiments of the invention disclosed herein are presently considered to be preferred, various changes and modifications can be made without departing from the scope of the invention. The scope of the invention is indicated in the appended claims and all changes that come within the meaning and range of equivalents are intended to be embraced therein.

What is claimed is:

1. A computer program product comprising a computer usable storage medium to store a computer readable program for a video game console, wherein the computer readable program, when executed on the video game console, causes the video game console to perform operations comprising:

generating a plurality of gaming image frames operable to display gaming images of the video game; and generating a plurality of crosshair navigation frames interleaved among the plurality of gaming image frames, wherein the plurality of crosshair navigation frames are operable to facilitate a navigation of a crosshair position within a display of the gaming images of the video game based on a cross-correlation of a video capture of at least two of the plurality of crosshair navigation frames.

2. The computer program product of claim 1, wherein each crosshair navigation frame is operable to display a crosshair navigation image pattern.

3. The computer program product of claim 1, wherein the plurality of gaming image frames and the plurality of crosshair navigation frames are divided into a plurality of frame sets.

4. The computer program product of claim 3, wherein a first frame set includes three gaming image frames and three crosshair navigation frames.

5. A gaming optical sensor, comprising:

a video capture module operable to frame image data indicative of a video capture of an optical projection of a plurality of gaming image frames displaying gaming images of a video game and of a plurality of crosshair navigation frames interleaved among the plurality of gaming image frames; and a crosshair navigation module operable to be in communication with the video capturing module to receive the frame image data, wherein the crosshair navigation module is further operable to generate crosshair navigation data indicative of a navigation of a crosshair position within the display of the gaming images of the video game based on a cross-correlation of a video capture of at least two of the plurality of crosshair navigation frames as indicated by the frame image data.

6. The gaming optical sensor of claim 5, wherein the cross-correlation by the crosshair navigation module of the video capture of the at least two of the plurality of crosshair navigation frames as indicated by the frame image data includes the at least two of the plurality of crosshair navigation frames facilitating a valid pattern recognition of a crosshair navigation image pattern.

7. The gaming optical sensor of claim 6, wherein a generation of the frame image data by the video capture module includes an optical capture of the plurality of crosshair navigation frames in a capture imaging area; and wherein the valid pattern recognition of the crosshair navigation image pattern includes the frame image data indicating an inclusive view of the crosshair navigation image pattern within the capture imaging area.

8. The gaming optical sensor of claim 5, wherein the video capture module includes:

a pixel array operable to generate the frame image data representative of an optical capture of the plurality of gaming image frames and the plurality of crosshair navigation frames.

9. The gaming optical sensor of claim 8, wherein the video capture module further includes:

an image processor operable to receive a communication of the frame image data from the pixel array to perform a pattern recognition of a crosshair navigation image pattern as displayed by a first video captured crosshair navigation frame.

10. The gaming optical sensor of claim 9, wherein the image processor is further operable to determine a validity of the pattern recognition of the crosshair navigation image pattern displayed by the first video captured crosshair navigation frame.

11. The gaming optical sensor of claim 10, wherein the image processor is further operable to generate a first absolute position frame base on a valid pattern recognition of the crosshair navigation image pattern as displayed by the first video captured crosshair navigation frame.

12. The gaming optical sensor of claim 11, where the crosshair navigation module includes:
  a navigation manager operable to receive an electrical communication of the first absolute position frame to determine an absolute shift in the crosshair position based on a cross-correlation of the first absolute position frame and a reference frame.

13. The gaming optical sensor of claim 11, where the crosshair navigation module includes:
  a navigation manager operable to receive an electrical communication of the first absolute position frame to designate the first absolute position frame as a reference frame.

14. The gaming optical sensor of claim 13, wherein the image processor is further operable to receive a communication of the frame image data from the pixel array to perform a pattern recognition of the crosshair navigation image pattern as displayed by a second video captured crosshair navigation frame.

15. The gaming optical sensor of claim 14, wherein the image processor is further operable to determine a validity of the pattern recognition of the crosshair navigation image pattern displayed by the second video captured crosshair navigation frame.

16. The gaming optical sensor of claim 15, wherein the image processor is further operable to generate a second absolute position frame base on a valid pattern recognition of the crosshair navigation image pattern as displayed by the second video captured crosshair navigation frame.

17. The gaming optical sensor of claim 16, where the navigation manager is further operable to receive an electrical communication of the second absolute position frame to determine an absolute shift in the crosshair position based on a cross-correlation of the second absolute position frame and the first absolute position frame as the designated reference frame.

18. A method of operating a video game, the method comprising:
  using a video game console to perform each of the following steps;
  generating frame image data indicative of a video capture of an optical projection of a plurality of gaming image frames displaying gaming images of the video game and of a plurality of crosshair navigation frames interleaved among the plurality of gaming image frames; and
  generating crosshair navigation data indicative of a navigation of a crosshair position within the display of the gaming images of the video game based on a cross-correlation of the video capture of at least two of the plurality of crosshair navigation frames as indicated by the frame image data.

19. The method of claim 18, wherein the cross-correlation of the video capture of the at least two of the plurality of crosshair navigation frames as indicated by the frame image data includes the at least two of the plurality of crosshair navigation frames facilitating a valid pattern recognition of a crosshair navigation image pattern.

20. The method of claim 19,
  wherein the generation of the frame image data includes optically capturing the plurality of crosshair navigation frames in a capture imaging area; and
  wherein the valid pattern recognition of the crosshair navigation image pattern includes the frame image data indicating an inclusive view of the crosshair navigation image pattern within the capture imaging area.

* * * * *